July 27, 1937.  W. E. HALE  2,088,552
WEIGHING MACHINE
Filed Oct. 25, 1935    2 Sheets-Sheet 1
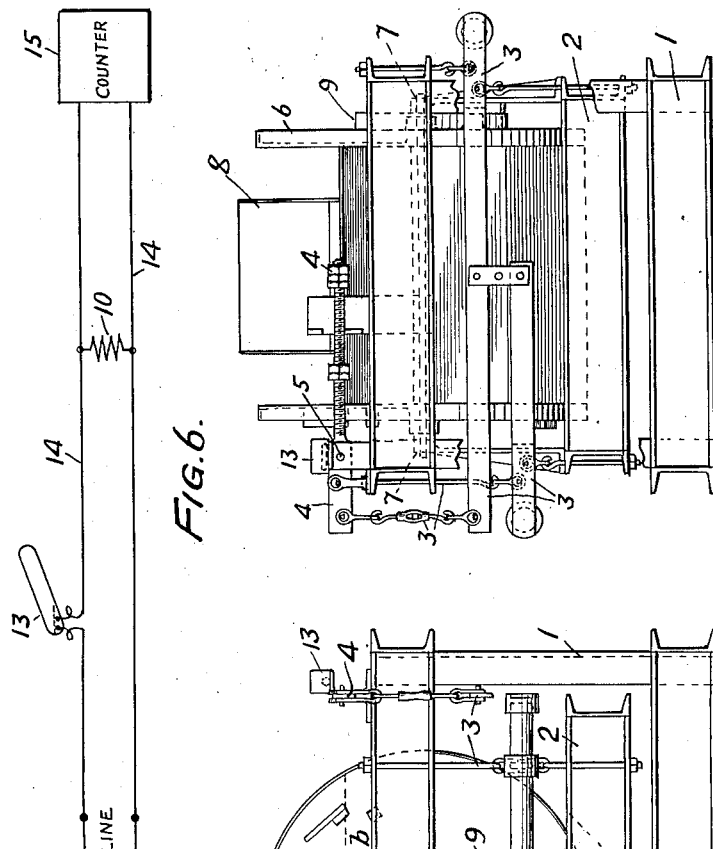
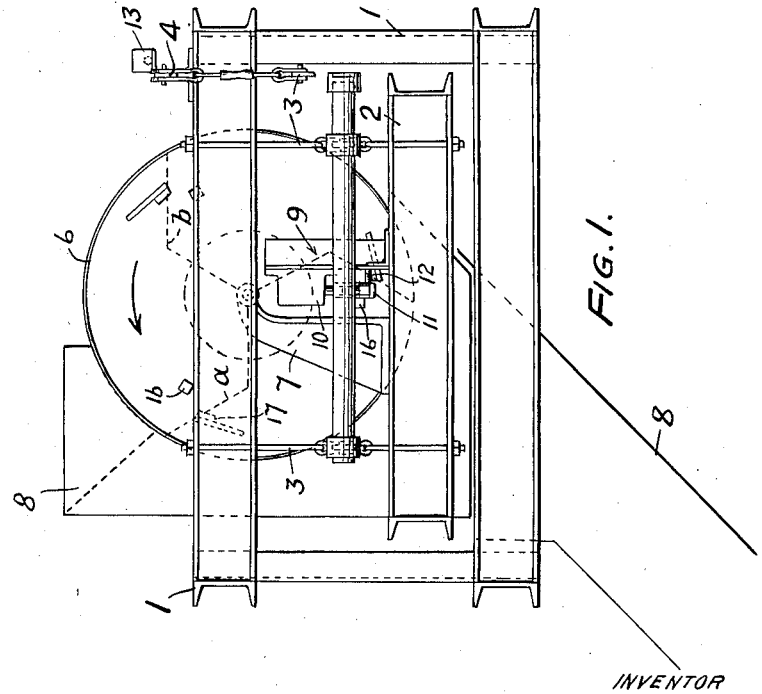
INVENTOR
William E. Hale
BY
Augustus B. Stoughton
ATTORNEY.

July 27, 1937.  W. E. HALE  2,088,552
WEIGHING MACHINE
Filed Oct. 25, 1935    2 Sheets-Sheet 2

WITNESS:

INVENTOR
William E. Hale
BY
Augustus B Stoughton
ATTORNEY.

Patented July 27, 1937

2,088,552

UNITED STATES PATENT OFFICE 2,088,552

WEIGHING MACHINE

William E. Hale, Fort Washington, Pa., assignor to Beaumont Birch Company, Philadelphia, Pa., a corporation of Pennsylvania Application October 25, 1935, Serial No. 46,722

4 Claims. (Cl. 249—19)

The invention relates to machines for automatically weighing coal or other fluent substance or material as it flows or is supplied to various machines or apparatus.

Objects of the invention are to weigh the material accurately so that its correct weight may be ascertained; to provide for recording the weight of the material over a considerable period of time; to obtain the advantages and simplicity of electrical control; and to obtain certainty of operation and precision of recording.

Other objects of the invention will appear from the following description at the end of which the invention will be claimed.

Generally stated, the invention consists in two frames arranged one within the other and of which one is fixed and the other is movable, scale levers and links interposed between the frames and by which the movable frame is suspended for rectilinear motion, a pocketed drum mounted for rotation on the movable frame and disposed in the path of travel of the substance to be weighed so as to be turned thereby, an electro-magnetic device, a recorder, a circuit for the recorder and magnetic device, and a mercury contact switch operated by movement of one of the scale levers and therefore subject to time lag in deenergizing the electro-magnetic device, and separate pairs of spaced stops on the drum cooperating with the electro-magnetic device and of which one serves to hold the drum when the magnetic device is deenergized and to release the drum when the electro-magnetic device is energized, and of which the other serves to hold the drum during prolonged energization of the electro-magnetic device due to lag in the operation of the contact.

The invention also comprises the improvements to be presently described and finally claimed.

Referring to the accompanying drawings forming part hereof and illustrating one embodiment of the invention chosen from others for the sake of illustration, Figure 1 is an elevational view of one end of a weighing machine embodying features of the invention.

Figure 2 is a side elevational view of the same.

Figure 6 is a diagrammatic and schematic view of the circuit connections showing a counter.

Figures 4, 5:
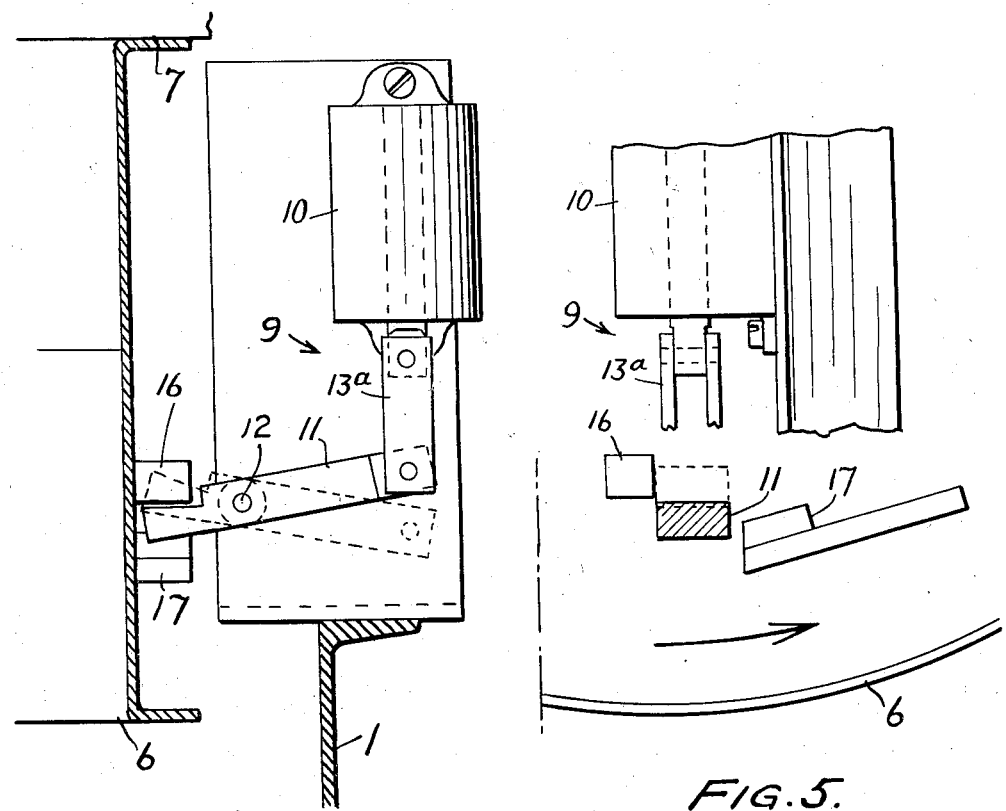
Figure 4 is a detached diagrammatic elevational view of certain of the parts drawn to an enlarged scale and showing a section of the drum which revolves about a horizontal axis.
Figure 5 is a side view of parts shown in Figure 4.

Referring to the drawings, 1 indicates a fixed frame which may be regarded as rectangular in plan. 2 indicates a vertically movable frame or scale platform shown as arranged within the frame 1, and it may be regarded as rectangular in plan. The frame 2 is suspended from the top of the frame 1 by means of a system of pivotal scale links and levers 3 which includes a scale arm 4 pivoted at 5. 6 is a pocketed drum mounted for rotation in bearings 7 carried by the movable frame 2. The drum 6 is interposed in the path 8 of the material to be weighed. The drum 6 is held at rest until one of its pockets $a$ is filled with material and then permitted to turn in response to the position of the scale arm 4 through the instrumentality of mechanism which will now be described. 9 is an electro-magnetic device carried by the frame 2 and shown to include an electro-magnet 10 and a locking lever 11 pivoted at 12 and connected with the core of the magnet 10 by a link 13$^a$. There is on the scale arm 4 a mercury contact switch 13 which controls a circuit 14 across which the magnet 10 is arranged and there is included in the circuit 14 a counter 15 actuated by the making and breaking of the circuit. When the pocket $a$ (Figure 1) of the drum is full the scale arm 4 rises to balanced position. In doing so the magnet 10 is energized turning the lever 11 downward into the position shown in full lines in Figure 4. The lever therefore releases the stop 16 on the drum so that the drum turns counterclockwise emptying the pocket $a$ and bringing the pocket $b$ into position to be filled. The scale arm 4 falls comparatively slowly and an interval of time may elapse before the magnet 10 is deenergized and the lever 11 turned into the position indicated by dotted lines in Figure 4. To ensure that the drum does not overtravel there is a stop 17 at the left in Figure 1. If the demagnetization of the magnet 10 is delayed the stop 17, contacting with the depressed end of the lever 11, arrests the drum, and when the magnet 10 is deenergized the lever 11 contacts with the stop 16 at the left in Figure 1 and prevents further travel of the drum so that after the drum has started to turn it is arrested either by the stop 17 or the stop 16 at the left, and finally comes to rest with the stop 16 in contact with the end of the lever 11, as indicated in dotted lines in Figure 4, and when this occurs the pocket $b$ is in the position formerly occupied by the pocket a. The described operation is repeated every time that a pocket is filled to the required weight.

Figure 3:
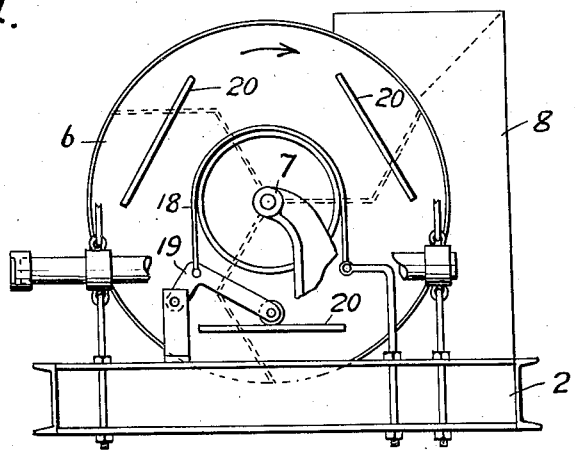
Figure 3 is an elevational view of the other end of the machine.

In Figure 3 there is shown brake mechanism consisting of a band brake 18 connected with a pivotal lever 19 of which the weight operates to apply the brake. On the end of the drum there are blades 20 arranged parallel to tangential position and they operate to clear the end of the lever 19 as the drum rotates to dump its load so that the brake may be applied to oppose excessive speed of rotation of the drum.

It will be observed that the weight of the material in a pocket acts vertically downward and, therefore, the movement of the scale arm 4 and the making of the contact, which releases the drum, is more accurate than is the case where the weight of the material acts radially on the drum to control its release because the material may accumulate nearer to or further from the center of revolution of the drum.

It will be obvious to those skilled in the art to which the invention relates that modifications may be made in details of construction and in matters of mere form without departing from the spirit of the invention which is not limited to such matters or otherwise than the prior art and the appended claims may require.

I claim:

1. A weighing machine comprising in combination two frames arranged one within the other and of which one is fixed and the other is movable, scale levers and links interposed between said frames and by which the movable frame is suspended for rectilinear motion, a pocketed drum mounted for rotation on the movable frame and disposed in the path of travel of the substance to be weighed so as to be turned thereby, an electromagnetic device, a recorder, a circuit for the recorder and magnetic device and a mercury contact switch operated by the movement of one of the scale levers and therefore subject to time lag in deenergizing the electromagnetic device, and sets of pairs of spaced stops on the drum cooperating with the electromagnetic device and of which one serves to hold the drum when the magnetic device is deenergized and to release the drum when the electromagnetic device is energized, and of which the other serves to hold the drum during prolonged energization of the electromagnetic device due to lag in the operation of the contact.

2. In a weighing machine, a scale platform, a drum revolvably mounted on the platform and provided with a series of pockets adapted to be successively filled with material to be weighed, a pivotally mounted scale arm movable in response to the increase in weight of the platform due to accumulation of material in a pocket, a plurality of stops mounted on said drum, a second plurality of stops mounted on said drum in spaced relation to said first stops, a pivotally mounted locking lever having one end adapted to contact with one of said first plurality of stops or with one of said second plurality of stops to arrest rotation of said drum due to the weight of the accumulation of material in a pocket, electro-magnetic means for moving said locking lever to one extreme position or the other, an electric switch operated by said scale arm by the movement of said scale arm due to the accumulation of material in a pocket, said movement causing said switch to control the energization of said electro-magnetic means and to thereby control the position of said locking lever, and a source of electricity for said switch and said electro-magnetic means.

3. In a weighing machine having a rotatably mounted drum containing a plurality of pockets for receiving material to be weighed, the combination of, a plurality of stops, a co-operating element mounted so as to be engageable with each of said plurality of stops in succession to arrest and hold said drum against rotation, electrically operated means for disengaging the stop and the element which are in engagement thereby causing rotation of the drum and for then engaging said co-operating element and one of said plurality of stops to arrest rotation of said drum regardless of the completion of its movement by said co-operating element, and means responsive to the weight of the material accumulated in a pocket of said drum for energizing said electrically operated means and responsive to the removal of the weight of the material accumulated in a pocket of said drum for de-energizing said electrically operated means.

4. In a weighing machine having a pocketed drum mounted for rotation with the pockets successively located in the path of travel of the material to be weighed, the combination comprising, at least one pair of spaced stops, a movable element co-operating with either stop of said pair of stops to arrest rotation of said drum and movable from engagement with one stop of said pair of stops to cause rotation of said drum due to the weight of material in a pocket, first means for moving said stop to either extreme position, and second means responsive to the weight of the material in a pocket for actuating said first means to move said element in one direction when a pocket is full and in the opposite direction when said pocket is empty.

WILLIAM E. HALE.